J. HERZLER, H. HENNINGER & W. FENNER.
MINING MACHINE.
APPLICATION FILED AUG. 12, 1908.
932,124.
Patented Aug. 24, 1909.
5 SHEETS—SHEET 1.
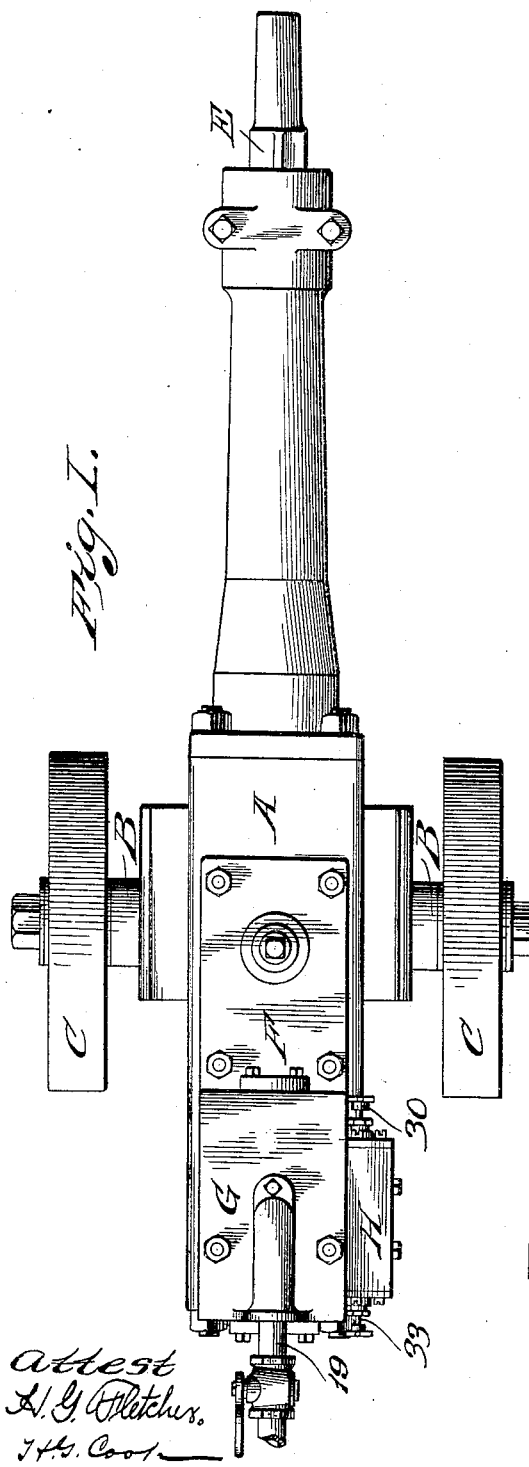
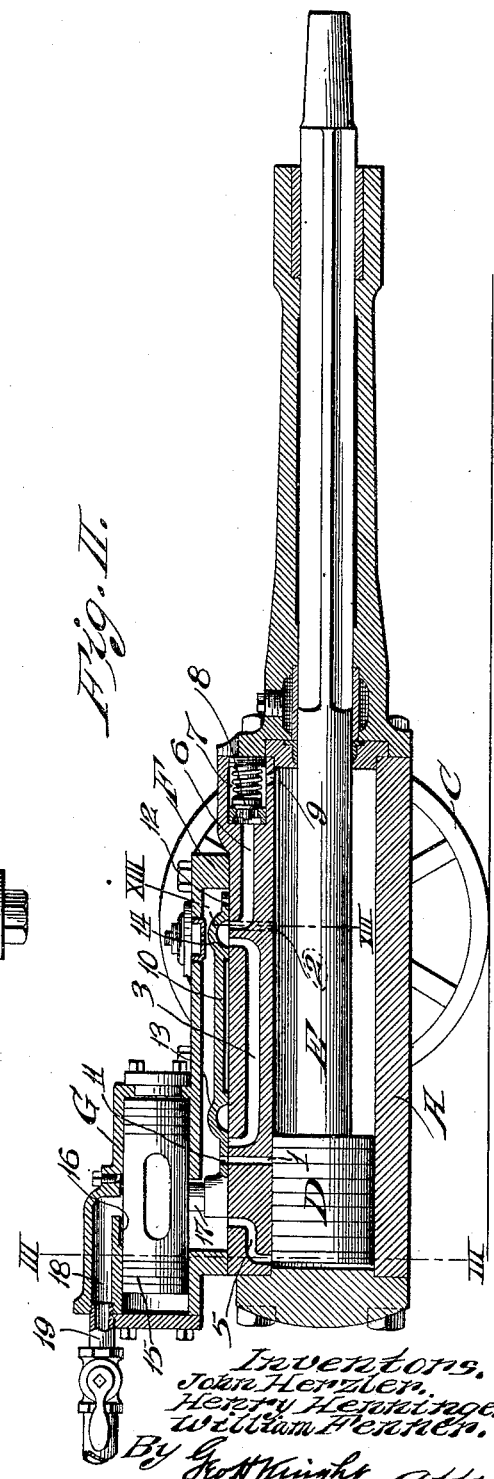

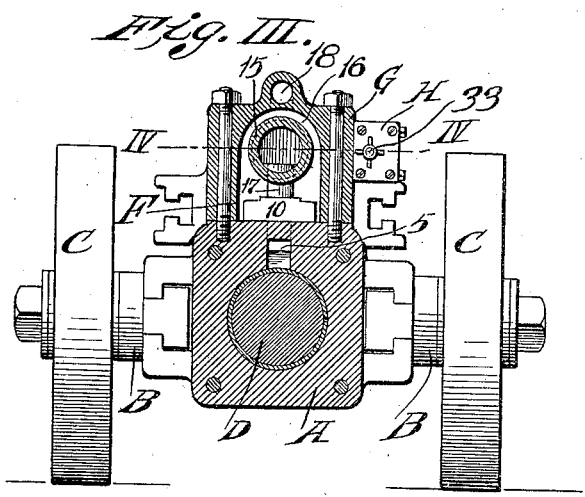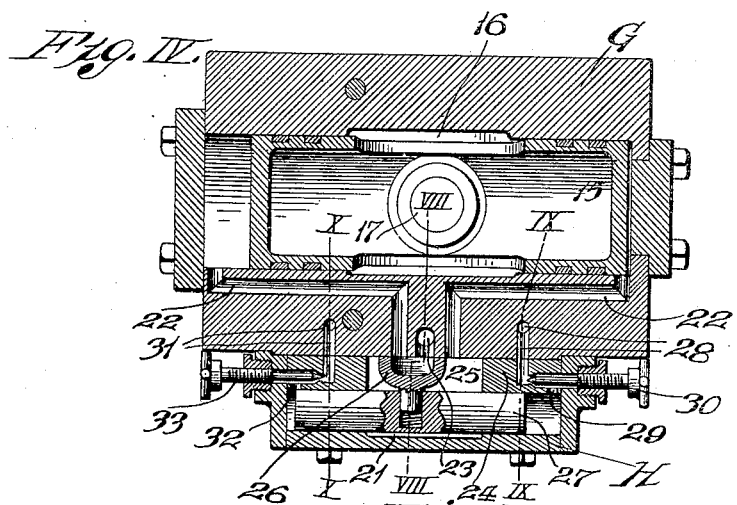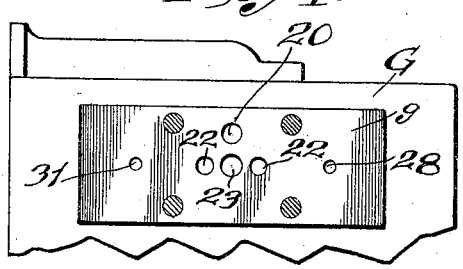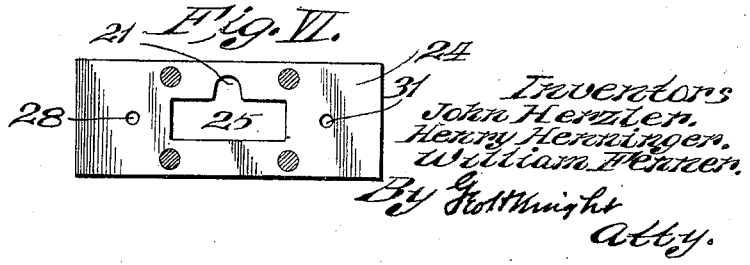

J. HERZLER, H. HENNINGER & W. FENNER.
MINING MACHINE.
APPLICATION FILED AUG. 12, 1908.
932,124.
Patented Aug. 24, 1909.
5 SHEETS—SHEET 3.
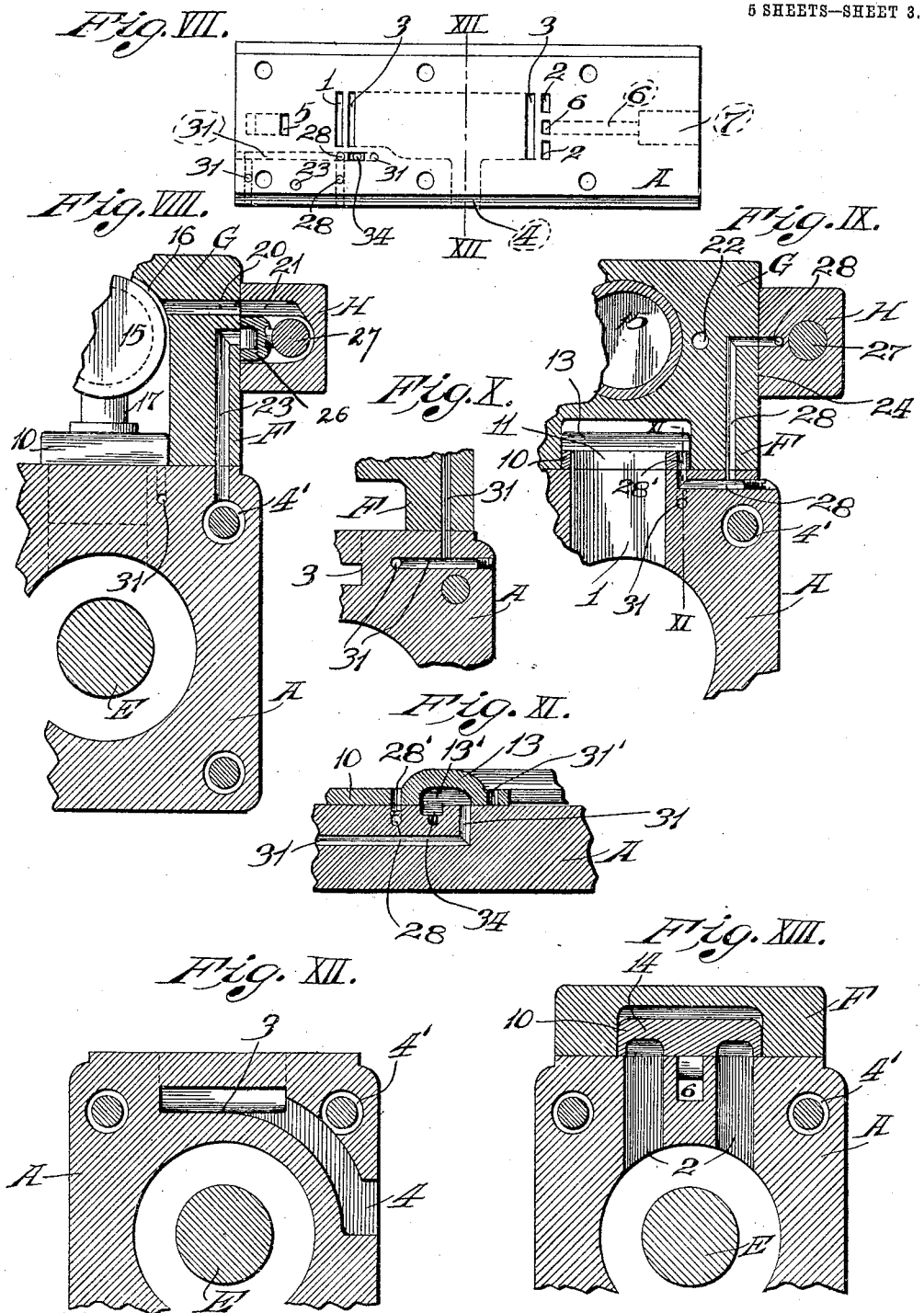

J. HERZLER, H. HENNINGER & W. FENNER.
MINING MACHINE.
APPLICATION FILED AUG. 12, 1908.
932,124.
Patented Aug. 24, 1909.
5 SHEETS—SHEET 4.
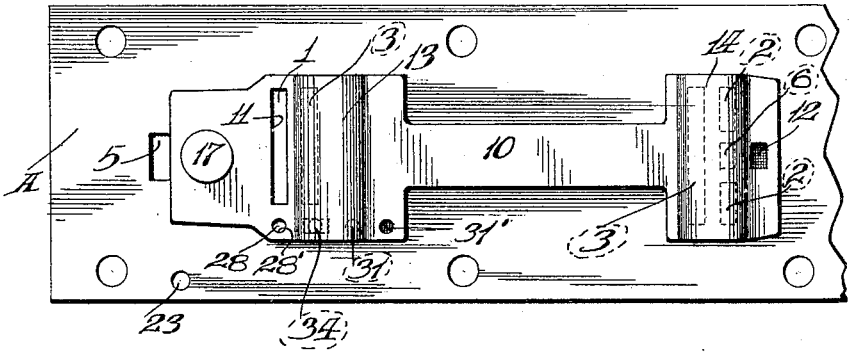
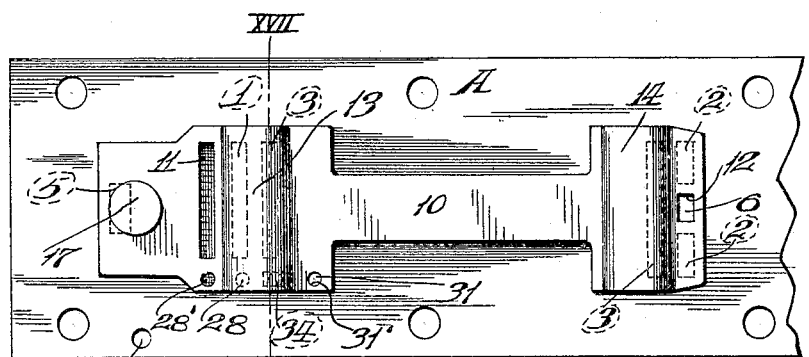
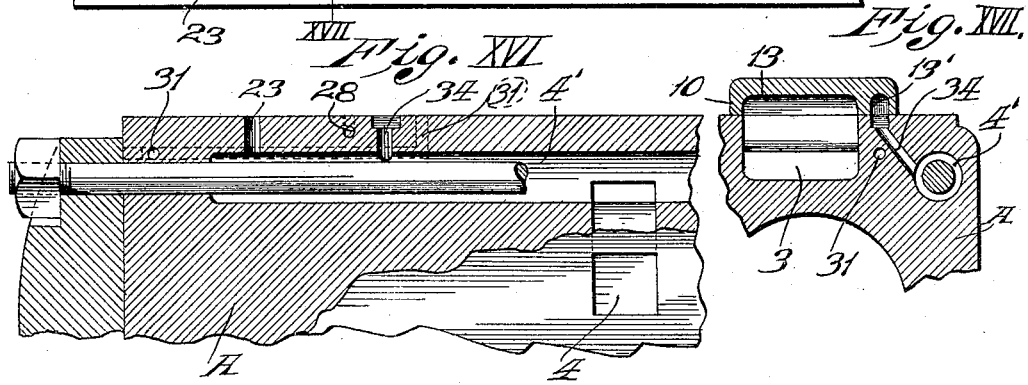

J. HERZLER, H. HENNINGER & W. FENNER.
MINING MACHINE.
APPLICATION FILED AUG. 12, 1908.
932,124.
Patented Aug. 24, 1909.
5 SHEETS—SHEET 5.
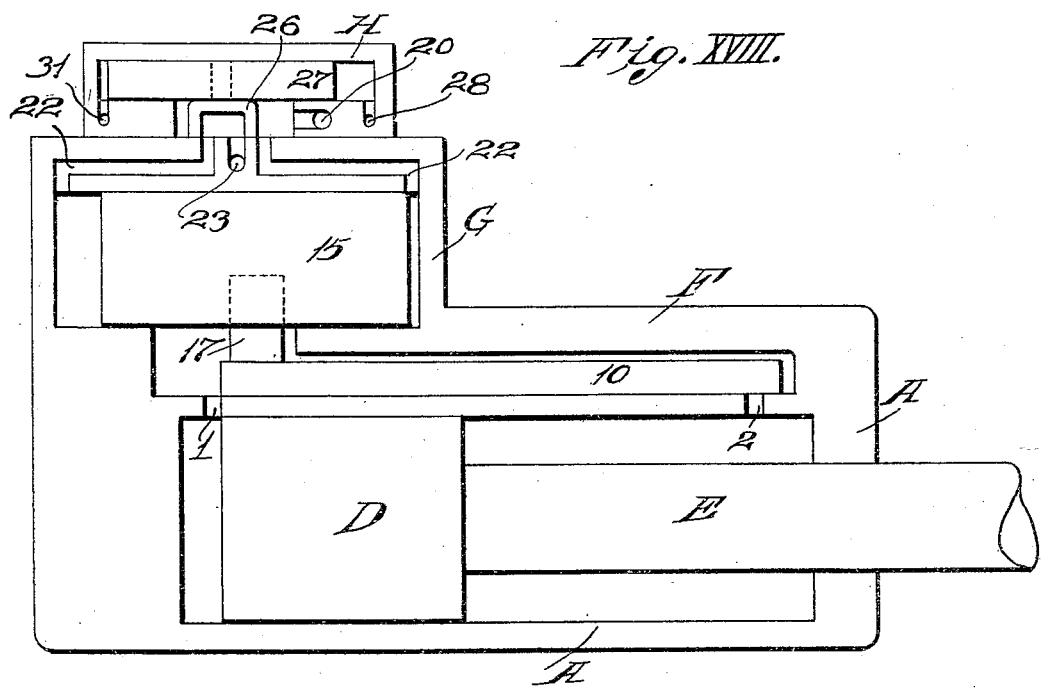
Fig. XVIII.
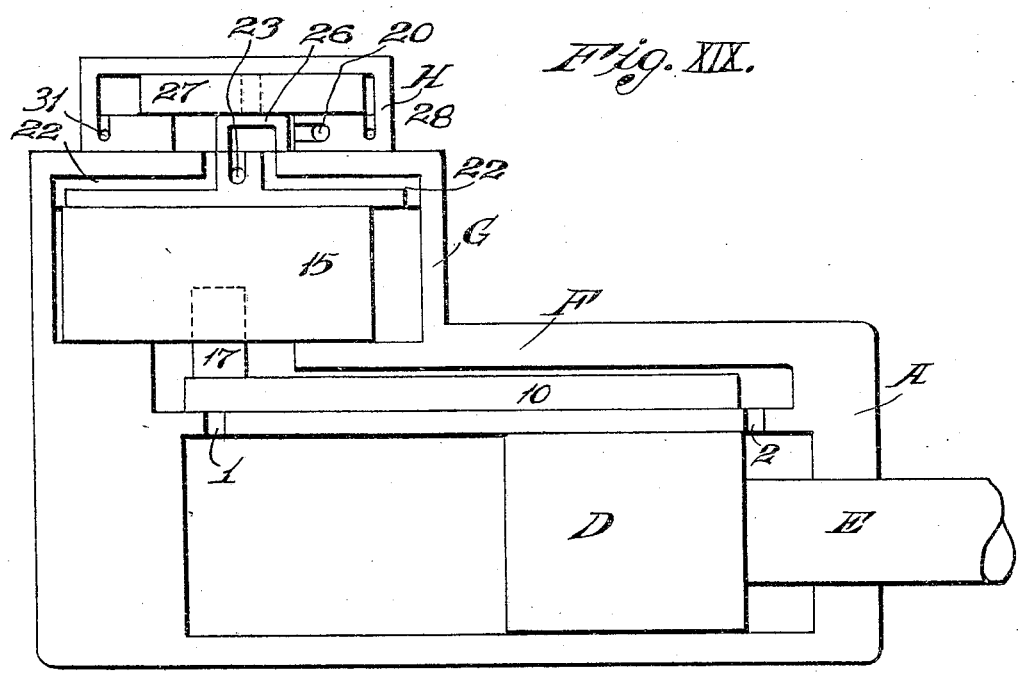
Fig. XIX.

UNITED STATES PATENT OFFICE.

JOHN HERZLER, HENRY HENNINGER, AND WILLIAM FENNER, OF BELLEVILLE, ILLINOIS.

MINING-MACHINE.

932,124.  Specification of Letters Patent.  Patented Aug. 24, 1909.

Application filed August 12, 1908. Serial No. 448,120.

*To all whom it may concern:*

Be it known that we, JOHN HERZLER, HENRY HENNINGER, and WILLIAM FENNER, all citizens of the United States of America, residing at Belleville, in the county of St. Clair and State of Illinois, have invented certain new and useful Improvements in Mining-Machines, of which the following is a full, clear, and exact description, reference being had to the accompanying drawings, forming part of this specification.

Our invention relates to that character of mining machines operated by compressed air and an example of which is to be found in Letters Patent of the United States of America issued to ourselves October 23, 1900, No. 660,434.

The present invention is in the nature of an improvement upon a machine shown and described in said patent.

Figure I is a top or plan view of our improved machine. Fig. II is a vertical longitudinal section taken through the center of the machine. Fig. III is a vertical cross section taken on line III—III, Fig. II. Fig. IV is an enlarged horizontal section taken on line IV—IV, Fig. III through the slide valve operating piston cylinder and the controller valve chest. Fig. V is an enlarged elevation of the side of the slide valve operating piston cylinder that receives the controller valve chest. Fig. VI is a rear elevation of the duct plate in the controller valve chest. Fig. VII is a top or plan view of the main cylinder of the machine. Fig. VIII is a vertical cross section taken on line VIII—VIII, Fig. IV and through the main cylinder of the machine. Fig. IX is a vertical cross section taken on line IX—IX, Fig. IV. Fig. X is a vertical cross section taken on line X—X, Fig. IV. Fig. XI is a longitudinal section taken on line XI—XI, Fig. IX. Fig. XII is an enlarged cross section taken on line XII—XII, Fig. VII. Fig. XIII is an enlarged vertical cross section taken on line XIII—XIII, Fig. II. Fig. XIV is a top or plan view of the main cylinder and the main slide valve thereon in its forward position. Fig. XV is a view similar to Fig. XIV with the main slide valve in its rear position. Fig. XVI is a longitudinal section through the main cylinder at the location of the exhaust duct. Fig. XVII is a vertical cross section taken on line XVII—XVII, Fig. XV. Fig. XVIII is a diagrammatical view illustrating the positions of the pistons when the main piston of the machine is ready to move upon its forward stroke or is moving upon said stroke. Fig. XIX is a diagrammatical view similar to Fig. XVIII illustrating the position of the pistons when the main piston is ready to move upon its rearward stroke or is moving upon said stroke.

In the accompanying drawings: A designates the main cylinder of our machine. This cylinder is supported by ground wheels C that are journaled to trunnions B attached to the main cylinder. Within the main cylinder is a piston D and a main piston-rod E, the latter of which extends to the exterior of the main cylinder and is adapted to receive a mining pick (not shown).

F is a main slide-valve chest surmounting the main cylinder and G is a slide valve-operating piston-cylinder which may be, and preferably is, made integral with the slide-valve-chest F and has communication with the chamber in said slide-valve chest.

H is a controller-valve-chest located alongside of and having communication, as will hereinafter appear, with said slide-valve-operating piston cylinder G.

The main cylinder A is provided with a plurality of ducts and ports through which compressed air is admitted to its chamber from the slide-valve-chest F and exhausted from said chamber for the purpose of operating the main piston D therein. These ducts and ports will be next set forth.

1 and 2 designate respectively rear and forward intermediate ducts in the top of the main cylinder, there being preferably two of the forward ducts, as seen in Figs. VII, XIII, XIV and XV. The rear and forward intermediate ducts 1 and 2 extend downwardly through the top of the main cylinder and are adapted to furnish direct communication between the chamber of the slide valve chest F and the chamber of the main cylinder A. The rear intermediate duct 1 provides for the admission of compressed air to said main cylinder chamber to drive the main piston D forward and also as an exhaust duct through which the compressed air is discharged from the rear end of the main cylinder chamber into an exhaust chamber 3 that extends longitudinally in the top of the main cylinder, and from which the previously used compressed air is discharged through main exhaust duct 4 leading to the exterior of the main cylinder at one side thereof, see Figs.

VII and XII. The forward intermediate ducts 2 serve as exhaust ducts only to liberate the compressed air from the forward end of the main cylinder chamber into the longitudinal exhaust chamber 3 during the forward stroke of the main piston D. At the rear end of the main cylinder and at its top is an admission duct 5 through which compressed air may pass to the rear end of the main cylinder chamber for the purpose of gaining access back of the main piston D to start it upon its forward stroke sufficiently to permit of the passage of compressed air through the rear intermediate duct 1 back of the main piston to complete its forward stroke. Extending longitudinally of the top of the main cylinder, and in a forward direction from a point intermediate of the forward intermediate ducts 2, is a duct 6, see Figs. II, VII and XIII, that leads to a longitudinal valve chamber 7 in line therewith at the front end of the main cylinder and in which is a spring controlled check-valve 8.

9 is a port leading from the valve chamber 7 to the chamber of the main cylinder at its forward end and through which compressed air, after passing through the longitudinal duct 6 and into the valve chamber 7, past the check-valve therein, passes into the main cylinder chamber for the purpose of moving the main piston D upon its rearward stroke.

10 designates a main slide-valve operable in the main slide-valve-chest F and which is actuated by means to be hereinafter set forth, and by which the passage of compressed air to the chamber of the main cylinder and other parts of the machine is controlled. In this slide-valve is a rear port 11 that is adapted to register with the rear intermediate duct 1 in the main cylinder and a forward port 12 adapted to register with the longitudinal duct 6 in said main cylinder to provide for the passage of air from the main slide-valve-chest to the chamber of the main cylinder when said ports and ducts are in registration with each other (see Figs. II, XIV and XV). The main slide-valve 10 is provided with rear and forward arches 13 and 14 that are adapted to respectively, and at different times, span the rear intermediate duct 1 and the adjacent inlet end of the longitudinal exhaust chamber 3 and the forward intermediate ducts 2 and the inlet end of said longitudinal exhaust chamber next adjacent to said forward intermediate ducts 2.

15 designates a main slide-valve-operating piston that is located in the slide-valve-operating-piston-cylinder G and is connected to the slide-valve by a stem 17. Around the central portion of said operating piston in said piston cylinder is a space 16 that communicates with the chamber in the main slide-valve-chest F. Compressed air for the operation of the machine is admitted to the piston cylinder G through a longitudinal inlet duct 18 to which air is delivered from a conducting pipe 19, and as the air is delivered into said inlet-duct 18 it passes directly through the space 16 around the operating piston 15 and into the chamber of the main slide-valve-chest F, and circulates through the machine as will hereinafter appear. As the compressed air enters the space 16 in the piston cylinder G a portion of it passes through a lateral duct 20 near the top of said piston cylinder and enters into a chamber 21 at the center of the controller-valve-chest H (see Figs. IV, V and VIII). Leading inwardly from the chest chamber 21, and longitudinally of and in the piston cylinder G, are ducts 22, that extend to the ends of and inwardly to the chamber of said piston cylinder to deliver the compressed air alternately first to one end of said cylinder chamber and then to the other end of the cylinder chamber to reciprocate the operating piston 15 therein, and cause it to reciprocate the main slide-valve 10.

Intermediate of the parallel ends of the ducts 22 that adjoin the air chamber 21 in the controller valve-chest H is an exhaust duct 23 which has communication with said air chamber as seen in Fig. IV, and extends inwardly and downwardly from the point of such communication, as seen in Fig. VIII, through the wall of the piston cylinder G and through the top portion of the main cylinder A to an exhaust intermediate duct 4', see Figs. VIII and XVI, which extends longitudinally of the main cylinder and leads to the main exhaust duct 4. The flow of compressed air from the chamber 21 in the controller valve-chest H to the ends of the cylinder chamber in the cylinder G, and the exhaust of air from each end of said cylinder chamber is controlled by means to be next described.

In the controller valve-chest H is a duct plate 24, see Figs. IV and VI, that is adapted to fit against the face $g$ of the side wall of the piston cylinder G through which the ducts 20, 22 and 23 extend. This plate is provided with a central aperture 25, see Figs. IV and VI, which constitutes a portion of the air chamber 21 with which said ducts communicate.

26 is a controller valve that is located in the opening 25 of the duct plate and is movable along the face $g$ of the piston cylinder G. The controller valve 26 is connected to a piston 27 located in the controller-valve-chest H and through the medium of which said valve is shifted to permit passage of compressed air from the air chamber 21 in said controller valve chest through either of the ducts 22 to the chamber in the piston cylinder G to provide for the exhaust of compressed air from either end of said piston cylinder, due to said valve spanning the duct 22 through which exhaust occurs, and the inlet end of the exhaust duct 23, see Fig. IV.

Compressed air for the actuation of the piston 27 is delivered to the ends of the controller-valve-chest H from the chamber of the slide-valve-chest F of the machine and this delivery is governed by the slide-valve 10.

28 is an air duct that first extends downwardly, see Figs. VII, IX and XI, in the top of the main cylinder A, then laterally and vertically in the main cylinder, then vertically through the wall of the piston cylinder G and horizontally through said wall into the duct plate 24 of the controller valve-chest H and longitudinally outwardly of said duct plate, see Fig. IV, toward an end of the piston chamber in the valve-chest H. The air is discharged from the duct 28 into the end of the piston chamber just mentioned through a port 29 and the passage of air through said duct is regulated by a throttle-valve 30. In the slide valve 10 alongside of its arch 13 is a vertical port 28' that is adapted to register with the inlet end of the duct 28 at the top of the cylinder A to provide for the passage of air into the duct from the main slide-valve-chest.

31 is an air duct, see Figs. IV, VII and IX to XI inclusive, through which air is delivered from the chamber of the main slide-valve-chest F to that end of the chamber in the controller valve-chest H opposite to that to which the air duct 28 leads. Said duct 31 first extends downwardly in the top of the main cylinder, then longitudinally of the main cylinder, beneath the duct 28, as most clearly seen in Figs. VII and XI, and then laterally and upwardly to the top of the main cylinder. From the top of the main cylinder the duct 31 extends vertically through the wall of the piston cylinder G, see Fig. X, and then horizontally through said wall into the duct plate 24 of the controller-valve-chest H and longitudinally outwardly of said duct plate, see Fig. IV, toward the end of the chamber in the valve-chest H opposite that to which the duct 28 leads. Air is discharged from the duct 31 into the end of the valve-chest chamber just mentioned through a port 32 and the passage of air through said duct is regulated by a throttle-valve 33. In the main slide-valve 10 at the inner side of its rear arch 13 opposite that containing the port 28' is a port 31' that is adapted to register with the inlet end of the duct 31 to provide for the passage of air through said duct from the chamber of the main slide-valve-chest F to the chamber of the controller-valve-chest H.

To provide for the exhaust of air from the ends of the chamber in the controller-valve-chest H through either of the ducts 28 and 31, when air is entering said valve-chest through the other duct, we provide in the rear arch 13 of the main-slide-valve 10 an exhaust duct 13' and in the wall of the main cylinder A immediately beneath said arch, an exhaust duct 34 that leads to the exhaust duct 4', as seen in Figs. XVI and XVII. The exhaust duct 13' is adapted to provide communication at different times between either the duct 28 or 31 and the exhaust duct 34, whereby, and while air is passing through one of said ducts 28 or 31, air is being discharged through the other of said ducts. In Fig. XIV the slide valve 10 is so positioned as to provide for delivery of air from the chamber in the main valve-chest F into the duct 28 while air is being exhausted through the duct 31, whereas, in Fig. XV, the slide valve 10 is shown in position for the passage of air through the port 31' into the duct 31 while air is being exhausted through the duct 28.

In the practical use of our mining machine, all of its parts are operated by compressed air admitted to the machine through the inlet duct 18 and in the following manner: As the air flows into said inlet duct it passes therefrom into the space 16 around the main slide-valve-operating piston 15 and into the chamber of the main slide-valve-chest F. A portion of the air also passes from the space 16 through the duct 20 and into the chamber 21 in the controller-valve-chest H. The air passes from the air chamber 21 into the air duct 22 that may, at the time being, be uncovered, due to the position of the controller-valve 26, and flows to an end of the chamber in the piston cylinder G to which the operating piston 15 therein has previously moved, with the result of forcing said operating piston toward the other end of the piston cylinder G. During the movement of the operating piston 15 as just stated, the main slide-valve 10 is carried by said operating piston in a direction corresponding to the direction of the movement of the operating piston. Assuming now that the pistons D and 15 located respectively in the main cylinder A and the slide-valve operating piston-cylinder G are in the positions, seen in Figs. II, IV and XVIII, the machine will be placed in action immediately upon the entrance of compressed air through the inlet duct 18, air space 16 around the central portion of the operating piston 15 and into the main slide valve chest F. As the air gains ingress into the chamber of said main slide-valve-chest it passes directly through the admission duct 5, which is at this time uncovered, and into the rear end of the piston chamber in the main cylinder. The air thus admitted to the main cylinder acts to drive the main piston D forwardly until said main piston has passed the inlet rear intermediate duct 1 and, communication at this time being maintained between the port 11 in the main slide-valve 10 and said rear intermediate duct 1, the air passes from the main valve-chest F into the rear end of the piston chamber of the main cylinder A and acts to forcibly drive the main piston D and main piston-rod E to complete the forward stroke of these parts, during which stroke the pick carried by the piston rod at the exterior of the main cylinder is operated for drilling action. During the forward stroke of said main piston and piston rod the air present in the forward end of the piston chamber of the main cylinder is exhausted through the exhaust forward intermediate ducts 2 beneath the forward slide-valve-arch 14 and into the exhaust chamber 3. Simultaneously with the passage of air into the chamber of the main cylinder of the machine to drive the main piston D therein forwardly, air passes from the air space 16 through the duct 20 and into the air chamber 21 in the controller-valve-chest H and passes from said chamber through the forward duct 22, that is shown uncovered in Fig. IV, to gain access in front of the forward end of the main slide-valve operating piston 15 in the piston cylinder G and drive said operating piston rearwardly. As this operating piston 15 moves rearwardly it carries with it the main slide-valve 10 with the result of moving said slide-valve to the position seen in Figs. XV and XIX. By this movement the admission duct 5 in the top of the main cylinder A is covered by the slide-valve, and the rear arch 13 of said slide-valve is caused to span the rear intermediate duct 1 and the adjacent inlet end of the exhaust chamber 3 in order that the air in the rear end of the main cylinder chamber may be exhausted through said rear intermediate duct 1 into said exhaust chamber. The main slide-valve is also so positioned at this time as to provide communication from the chamber of the main slide-valve-chest F through the forward port 12 in the slide-valve, the longitudinal duct 6 in the main engine cylinder, the check-valve chamber 7 and the port 9 into the forward end of the chamber of the main cylinder. The air is thus permitted to pass from the chamber of the main slide-valve-chest into the forward end of the chamber in the main cylinder and drive the main piston D in said last named chamber upon its rearward stroke.

While the main slide-valve is in its rear position, communication is established through the port 31' in said valve into the duct 31 and air passes from the main slide-valve-chest through said duct to the forward end of the chamber in the controller-valve-chest H, whereby the piston 27 in said controller-valve-chest is moved rearwardly and carries with it the controller-valve 26, moving said controller-valve to a position that will establish communication through the rear duct 22 in the cylinder G from the air chamber 21 in the controller-valve-chest to the rear end of the chamber in the cylinder G and also provide for exhaust through the forward duct 22 into the exhaust duct 23. At such time the air is exhausted from the forward end of the chamber in the controller-valve chest through the duct 28 and to the exhaust ducts 13' and 34. The air admitted to the rear end of the chamber in the piston cylinder G acts to drive the operating piston 15 therein forwardly, and as a consequence, said operating piston moves the main slide-valve 10 back of its starting position, when the forward stroke of the main piston of the machine will occur, due to the passage of air into the rear end of the main cylinder chamber as first explained. The main slide-valve having been returned to its first position, causes communication to be established between the chamber in the main slide-valve-chest F through the port 28' in said valve, the duct 28 at this time being in registration with said port and the forward end of the chamber in the controller-valve chest H. The establishment of this communication into said controller-valve-chest provides for the rearward movement of the piston 27 that operates the controller valve 26 and said controller-valve is therefore returned to its former position to permit passage of air from the air chamber 21 through the forward duct 22 to the forward end of the chamber in the cylinder G in order that the operating piston 15 may be again moved rearwardly and carry the main slide-valve 10 with it. During the last named movement of the piston 27 in the controller valve chest, the air previously present in the rear end of said valve chest is exhausted through the duct 31 and the exhaust ducts 13' and 34.

We claim:—

A mining machine comprising a main cylinder, a main piston, and a main piston rod within the main piston, a main slide-valve chest combined with the main cylinder, an operating piston cylinder, combined with the main slide-valve chest and having an inlet duct, a controller valve-chest combined with the operating piston cylinder, rear and forward intermediate ducts providing communication between the main slide-valve chest and the main piston chamber, a rear duct providing communication between the main slide-valve chest and the main piston chamber, a forward longitudinal valve-chamber, a forward longitudinal duct providing communication between the main slide-valve chest and the longitudinal valve chamber, a forward port providing communication between the longitudinal valve chamber and the main piston chamber, an exhaust duct, a longitudinal exhaust chamber providing communication between the main slide-valve chest and the exhaust duct, a main slide valve having a rear port adapted to register with the rear intermediate duct, a forward port adapted to register with the longitudinal duct, a rear arch having an exhaust duct and adapted to span the rear intermediate duct and one end of the longitudinal exhaust chamber, a forward arch adapted to span the forward ducts and the other end of the longitudinal exhaust chamber, and ports adjacent to the rear arch, an operating piston within the operating piston cylinder and carried by the main slide-valve, a duct plate having an aperture and ports and located within the chest chamber, a piston within the chest chamber and carrying a controller valve within the aperture of the duct plate, ducts providing communication between the main slide valve chest and the chest chamber, ducts providing communication between the chest chamber and the operating piston chamber, an intermediate exhaust duct leading to the main exhaust duct, an exhaust duct leading from the chest chamber to the intermediate exhaust duct, a spring controlled check valve within the longitudinal valve chamber, and throttle valves controlling the ducts leading to the chest chamber.

JOHN HERZLER.
HENRY HENNINGER.
WM. FENNER.

In presence of—
B. J. HEMMER,
W. H. PFINGSTEN.